US011324005B2

United States Patent
Yu et al.

(10) Patent No.: US 11,324,005 B2
(45) Date of Patent: May 3, 2022

(54) WIRELESS FIDELITY (WI-FI) AUTO CHANNEL SELECTION METHOD AND COMMUNICATION DEVICE USING THE SAME

(71) Applicant: Wistron Corp., New Taipei (TW)

(72) Inventors: Cheng-Ru Yu, New Taipei (TW); Chien-Heng Lai, New Taipei (TW)

(73) Assignee: Wistron Corp., New Taipei (TW)

( * ) Notice: Subject to any disclaimer, the term of this patent is extended or adjusted under 35 U.S.C. 154(b) by 143 days.

(21) Appl. No.: 16/729,270

(22) Filed: Dec. 27, 2019

(65) Prior Publication Data

US 2021/0076382 A1 Mar. 11, 2021

(30) Foreign Application Priority Data

Sep. 10, 2019 (TW) .................. 108132509

(51) Int. Cl.
*H04W 72/04* (2009.01)
*H04W 24/08* (2009.01)
*H04W 84/12* (2009.01)

(52) U.S. Cl.
CPC ....... *H04W 72/0486* (2013.01); *H04W 24/08* (2013.01); *H04W 84/12* (2013.01)

(58) Field of Classification Search
None
See application file for complete search history.

(56) References Cited

U.S. PATENT DOCUMENTS

| | | |
|---|---|---|
| 2007/0099622 A1 | 5/2007 | Rappaport et al. |
| 2007/0292142 A1* | 12/2007 | Hashimoto .......... H04B 10/505 398/186 |
| 2008/0159210 A1 | 7/2008 | Zaks et al. |
| 2010/0304738 A1 | 12/2010 | Lim |
| 2015/0351090 A1 | 12/2015 | Yamamoto et al. |
| 2017/0086204 A1* | 3/2017 | Jung ................ H04W 28/0263 |
| 2019/0045397 A1* | 2/2019 | Mueck ................ H04W 88/06 |

FOREIGN PATENT DOCUMENTS

WO  WO 2007/041305 A1  4/2007

* cited by examiner

*Primary Examiner* — Chi H Pham
*Assistant Examiner* — Raul Rivas

(57) ABSTRACT

A communication device is provided. The communication device includes a measurement device and a controller. The measurement device is configured to measure operation parameters and noise parameters corresponding to Wi-Fi channels used by the communication device. In response to the controller determining that a wireless transmitter/receiver unit (WTRU) is to connect to the communication device, the controller calculates a signal-to-noise ratio and a user ratio corresponding to each Wi-Fi channel according to the operation parameters and noise parameters, and calculates a congestion traffic value corresponding to each Wi-Fi channel according to the signal-to-noise ratio and the user ratio of each Wi-Fi channel. The controller selects a first Wi-Fi channel having the smallest congestion traffic value from among the plurality of Wi-Fi channels to communicate with the WTRU.

20 Claims, 3 Drawing Sheets

WIRELESS FIDELITY (WI-FI) AUTO CHANNEL SELECTION METHOD AND COMMUNICATION DEVICE USING THE SAME

CROSS REFERENCE TO RELATED APPLICATIONS

This Application claims priority of Taiwan Patent Application No. 108132509 Sep. 10, 2019, the entirety of which is incorporated by reference herein.

BACKGROUND OF THE DISCLOSURE

Field of the Disclosure

The present disclosure relates to a communication device, and, in particular, to a wireless fidelity (Wi-Fi) auto channel-selection method and a communication device using the same.

Description of the Related Art

With rapid development of the internet, masses of people are relying more heavily on Wi-Fi access points as the Internet develops rapidly. Therefore, Wi-Fi sharers or access points have become indispensable communication devices in various places. However, conventional Wi-Fi channel automatic selection methods do not take the different types of noise intensity into consideration, so the noise may affect the transmission speed of Wi-Fi signals, thereby causing a poor user experience.

Accordingly, there is demand for a Wi-Fi channel auto channel-selection method and a communication device using the same to solve the aforementioned problem.

BRIEF SUMMARY OF THE DISCLOSURE

In an exemplary embodiment, a communication device is provided. The communication device includes a measurement device and a controller. The measurement device is configured to measure a plurality of operation parameters and a plurality of noise parameters corresponding to a plurality of wireless fidelity (Wi-Fi) channels used by the communication device. In response to the controller determining that a wireless transmitter/receiver unit (WTRU) is to connect to the communication device, the controller calculates a signal-to-noise ratio and a user ratio of each Wi-Fi channel according to the operation parameters and noise parameters, and calculates a congestion traffic value for each Wi-Fi channel according to the signal-to-noise ratio and the user ratio of each Wi-Fi channel. The controller selects a first Wi-Fi channel having the smallest congestion traffic value from among the plurality of Wi-Fi channels to communicate with the WTRU.

In some embodiments, the controller calculates a reception power of a receiver of the communication device in each Wi-Fi channel according to a transmission power of a transmitter of the communication device, a first antenna gain of the transmitter, a second antenna gain of the receiver, and a distance between the communication device and an antenna of the WTRU.

In some embodiments, the controller calculates a noise floor value of each Wi-Fi channel according to a first signal power of an output terminal of a power amplifier of the communication device, a second signal power of an input terminal of the power amplifier, a first noise power of the output terminal of the power amplifier, a second noise power of the input terminal of the power amplifier, and a bandwidth of each Wi-Fi channel.

In some embodiments, the controller divides the reception power by the noise floor value corresponding to each Wi-Fi channel to obtain the signal-to-noise ratio corresponding to each Wi-Fi channel. The controller divides a current number of users of each Wi-Fi channel by a predetermined number of users to obtain the user ratio of each Wi-Fi channel. The controller divides the user ratio by the signal-to-noise ratio corresponding to each Wi-Fi channel to obtain the congestion traffic value of each Wi-Fi channel.

In some embodiments, the controller repeatedly calculates the signal-to-noise ratio of the selected first Wi-Fi channel, and the signal-to-noise ratio comprises a first level, a second level, and a third level. The controller classifies the signal-to-noise ratio into the first level, the second level, or the third level according to a predetermined maximum signal-to-noise ratio and a predetermined worst signal-to-noise ratio of the first Wi-Fi channel, wherein the third level is higher than the second level, and the second level is higher than the first level.

In the embodiment, in response to the signal-to-noise ratio corresponding to the first Wi-Fi channel being at the first level, the controller recalculates the congestion traffic value corresponding to each Wi-Fi channel.

In the embodiment, in response to the congestion traffic value corresponding to at least one of the Wi-Fi channels being smaller than the congestion value corresponding to the selected first Wi-Fi channel, the controller transmits a notification signal to the WTRU to notify the user to confirm whether to switch to a second Wi-Fi channel having a smaller congestion traffic value, wherein the second Wi-Fi channel is different from the first Wi-Fi channel.

In the embodiment, in response to the user confirming to switch to the second Wi-Fi channel having the lower congestion traffic value, the controller calculates and selects the second Wi-Fi channel having the smallest congestion traffic value to reconnect to the WTRU.

In the embodiment, in response to the user confirming not to switch to the second Wi-Fi channel having the smaller congestion traffic value, the controller determines whether the signal-to-noise ratio corresponding to the selected first Wi-Fi channel is at the first level after a predetermined time; and in response to the signal-to-noise ratio corresponding to the selected first Wi-Fi channel being at the first level, the controller recalculates the congestion traffic value corresponding to each Wi-Fi channel.

In another exemplary embodiment, a wireless fidelity (Wi-Fi) channel auto-selection method for use in a communication device is provided. The communication device includes a measurement device configured to measure a plurality of operating parameters and noise parameters corresponding to a plurality of Wi-Fi channels used by the communication device. The method includes the following steps: in response to determining that a wireless transmitter/receiver unit (WTRU) is to connect to the communication device, calculating a signal-to-noise ratio and a user ratio of each Wi-Fi channel according to the operation parameters and noise parameters, and calculating a congestion traffic value for each Wi-Fi channel according to the signal-to-noise ratio and the user ratio of each Wi-Fi channel; and selecting a first Wi-Fi channel having the smallest congestion traffic value from among the plurality of Wi-Fi channels to communicate with the WTRU.

BRIEF DESCRIPTION OF THE DRAWINGS

The present disclosure can be more fully understood by reading the subsequent detailed description and examples with references made to the accompanying drawings, wherein.

DETAILED DESCRIPTION OF THE DISCLOSURE

The following description is made for the purpose of illustrating the general principles of the disclosure and should not be taken in a limiting sense. The scope of the disclosure is best determined by reference to the appended claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
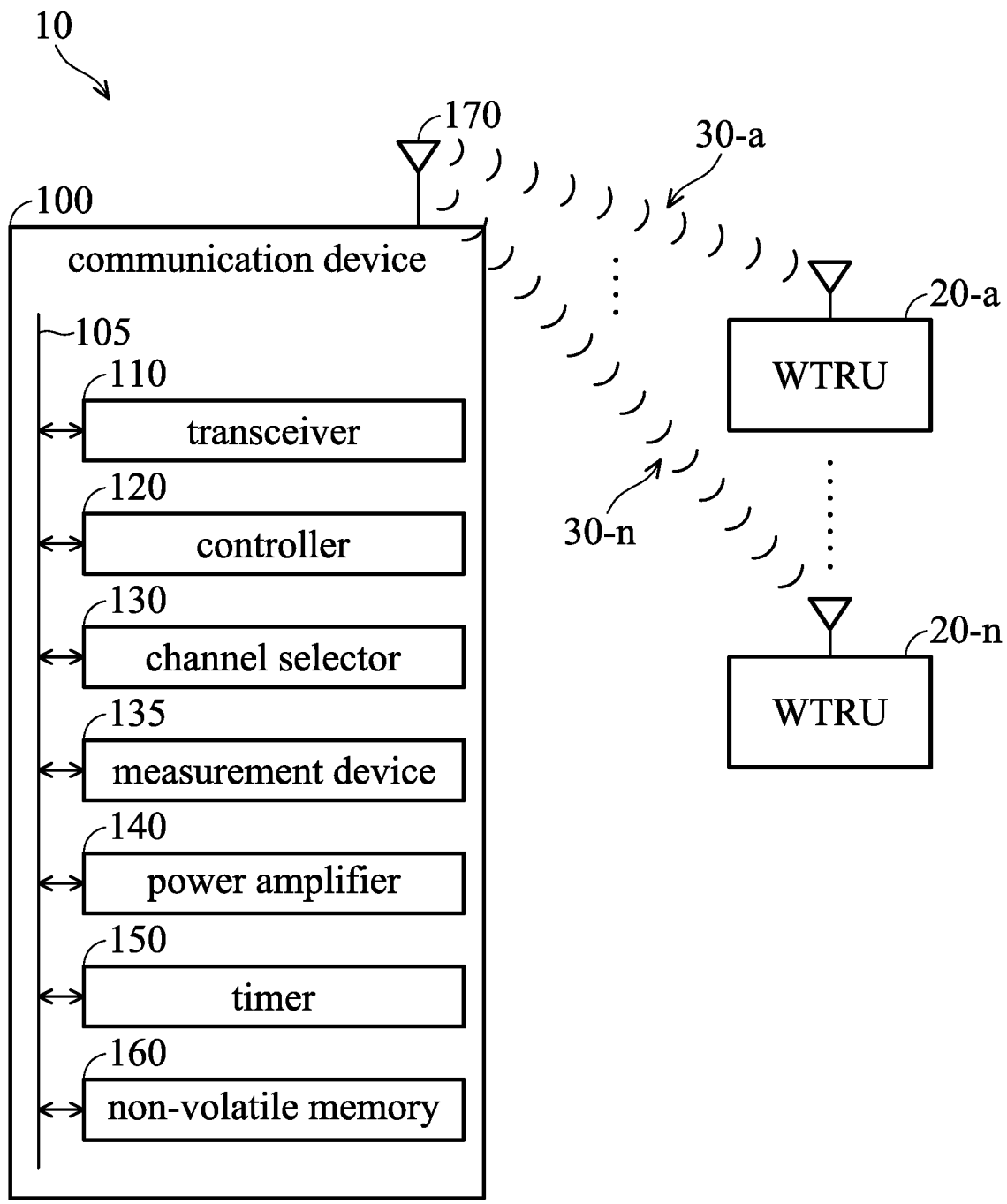
FIG. 1 is a diagram of a wireless communication system in accordance with an embodiment of the disclosure.

FIG. 1 is a diagram of a wireless communication system in accordance with an embodiment of the disclosure. The wireless communication system 10 may include a communication device 100 and a plurality of wireless transmitting/receiving units (WTRUs) 20-a to 20-n. The communication device 100, for example, may be a wireless sharer, a wireless access point, or a base station, etc., but the disclosure is not limited thereto. The terms "base station" and "access point" used in the disclosure can be an evolved node B, an advanced base station (ABS), a base transceiver system (BTS), a home base station, a repeater station, a diffuser, a repeater device, an intermediate node, an intermediate object and/or satellite-based communication base station, a remote radio head (RRH), and the like, but the disclosure is not limited thereto.

The WTRUs 20-a to 20-n, for example, may be user equipment (UE), advance mobile stations (AMS), servers, user terminals, desktop computers, laptops, network computers, workstations, personal digital assistants (PDA), tablet PCs, scanners, smartphones, pagers, cameras, televisions, handheld video game devices, music devices, wireless sensors, smart telephones, and the like. In some applications the user equipment may be a stationary computer device that operates in a bus, train, airplane, boar, car, or other similar mobile environment, but the disclosure is not limited thereto.

As depicted in FIG. 1, the communication device 100 may include a transceiver 110, a controller 120, a channel selector 130, a measurement device 135, a power amplifier 140, a timer 150, a non-volatile memory 160, and an antenna 170. The transceiver 110, controller 120, channel selector 130, measurement device 135, power amplifier 140, timer 150, non-volatile memory 160, and antenna 170 are electrically connected to each other via a bus 105. The communication device 100, for example, may support wireless communication standards such as IEEE 802.11 a/b/g/n or above.

The controller 120 may be configured to control operations of each element in the communication device 100, wherein the controller 120, for example, may be implemented by a general-purpose processor, a digital signal processor (DSP), or a field programmable gate array (FPGA), but the disclosure is not limited thereto. The controller 120 of the communication device 100 may emit wireless signals 30-a to 30-n to transmit data to the WTRUs 20-a to 20-n or receive wireless 30-a to 30-n from the WTRUs 20-a to 20-n via the antenna through the transceiver 110. For example, the transceiver 110, for example, may perform low noise amplification, impedance matching, frequency mixing, frequency up conversion or down conversion, filtering, and the like. The transceiver 110 may include a mixer, an oscillator, an analog-to-digital converter (ADC), a digital-to-analog converter (DAC), filters, etc.

The channel selector 130 is configured to automatically select the best Wi-Fi channel according to a plurality of parameters, and communicate with each of the WTRUs 20-a to 20-n using the selected best Wi-Fi channel. For example, the channel selector 130 can be implemented by a processor, an application-specific integrated circuit (ASIC), or a field-programmable gate array (FPGA), but the disclosure is not limited thereto. In some embodiments, the channel selector 130 can be integrated into the controller 120.

The measurement device 135, for example, may measure various operation parameters required by the communication device 100, such as the reception power Pr of the receiver, emitting power Pt of the transmitter, antenna gain Gt of the transmitter, antenna gain Gr of the receiver, wavelength λ of the wireless signal, distance R between the communication device 100 and the antenna of each WTRU. The antenna gain Gr of the transmitter and the antenna gain Gr of the receiver are directional, so they are expressed in units of dBi. In addition, the reception power Pr of the receiver and the emitting power Pt of the transmitter are expressed in units of dBm or dBW.

The power amplifier 140 is configured to control the transmission power of the wireless signal emitted by the communication device 100. For example, the power amplifier 140 may include an input terminal and an output terminal. The input terminal may receive the wireless signal to be transmitted from the transceiver 110, and the wireless signal is amplified by the power amplifier 140, so that the amplified wireless signal such as wireless signal 30a to 30n can be emitted by the antenna 170 via the output terminal. In some embodiments, the power amplifier 140 can be integrated into the transceiver 110.

The non-volatile memory 160 is configured to store program code or firmware for operating the communication device 100, wherein the non-volatile memory 160, for example, may be a hard disk drive (HDD), a solid-state disk (SSD), a flash memory, or a read-only memory, but the disclosure is not limited thereto. The controller 120 may read the program code or firmware from the non-volatile memory 160 for execution to perform corresponding operations of the communication device 100.

In addition, the measurement device 135 is further configured to measure or calculate various noise parameters required by the communication device 100, such as the signal power So of the output terminal of the power amplifier 140, signal power Si of the input terminal of the power amplifier 140, noise power No of the output terminal of the power amplifier 140, and noise power Ni of the input terminal of the power amplifier 140. The measurement device 135 may scan each Wi-Fi channel to obtain the current number of users of each Wi-Fi channel.

Figure 2:
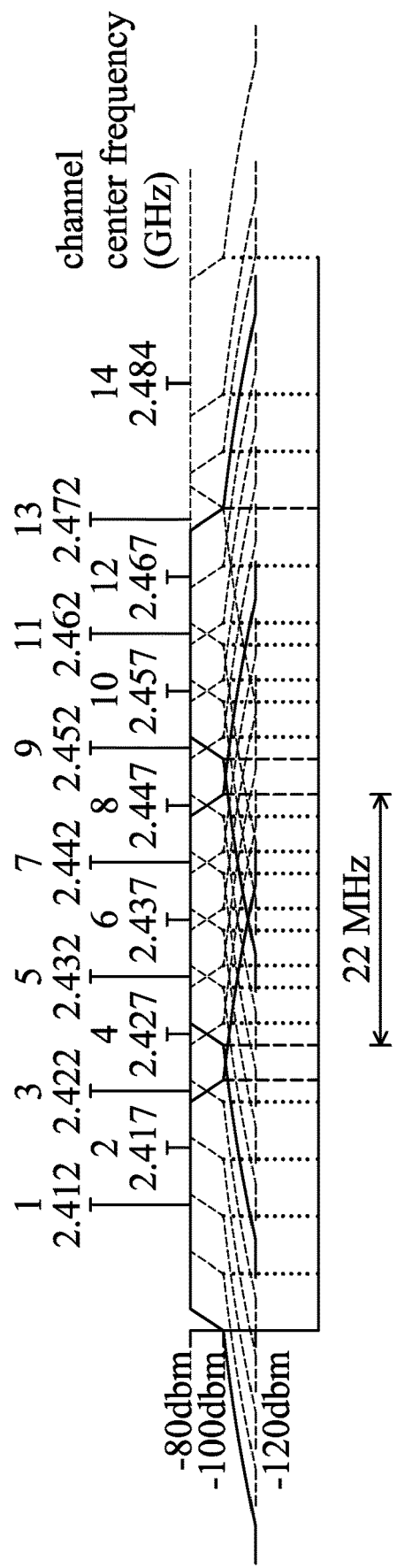
FIG. 2 is a diagram of Wi-Fi channels in the 2.4 GHz band in accordance with an embodiment of the disclosure.

FIG. 2 is a diagram of Wi-Fi channels in the 2.4 GHz band in accordance with an embodiment of the disclosure.

In an embodiment, taking the IEEE 802.11b ISM band of 2.4 GHz as an example, the ISM band can be divided into 14 Wi-Fi channels such as channel 1 to channel 14, and the bandwidth for each Wi-Fi channel may be 22 MHz, as depicted in FIG. 2. For example, the center frequency for channels 1 to 14 may be 2.412 GHz, 2.417 GHz, 2.422 GHz, 2.427 GHz, 2.432 GHz, 2.437 GHz, 2.442 GHz, 2.447 GHz, 2.452 GHz, 2.457 GHz, 2.462 GHz, 2.467 GHz, 2.472 GHz, and 2.484 GHz, respectively.

For example, channels 1, 6, and 11 are the Wi-Fi channels most commonly used by general users because the frequency bands of channels 1, 6, and 11 do not overlap each other, as shown in FIG. 2. If the communication device 100 is operated in Taiwan, channels 1 to 11 can be used.

Referring to FIG. 1 again, in an embodiment, the controller 120 may obtain various operation parameters from the measurement device 135 after the communication device is powered on and the Wi-Fi channel to be used has not been determined. For example, the aforementioned operation parameters may include the emitting power Pt of the transmitter (e.g., the transmitter of the transceiver 110), antenna gain Gt of the transmitter, antenna gain Gr of the receiver (e.g., the receiver of the transceiver 110), wavelength $\lambda$ of the wireless signal, distance R between the communication device 100 and the antenna of each WTRU, and the operation parameters can be used to calculate the reception power Pr of the receiver that can be expressed by equation (1):

$$P_r = P_t + G_t + G_r + 20\log_{10}\left(\frac{\lambda}{4\pi R}\right) \quad (1)$$

where equation (1) can be regarded as the Friis transmission equation, and the log value $$20\log_{10}\left(\frac{\lambda}{4\pi R}\right)$$

is the path loss of the line of sight (LOS).

The controller 120 may obtain various noise parameters from the measurement device 135, such as the signal power So of the output terminal of the power amplifier 140, signal power Si of the input terminal of the power amplifier 140, noise power No of the output terminal of the power amplifier 140, noise power Ni of the input terminal of the power amplifier 140, and the bandwidth BW of each Wi-Fi channel (e.g., 22 MHz). The aforementioned noise parameters can be used to calculate the noise floor $N_{FL}$ that can be expressed by equation (2):

$$N_{FL} = NF + JNN \quad (2)$$

Where JNN denotes a value of Johnson-Nyquist noise (i.e., heat noise) that can be expressed in units of dBm. For example, at the room temperature T=300K, the heat noise JNN=−174+10*log(BW) dBm. In addition, NF denotes the noise factor of the receiver (e.g., the receiver of the transceiver 110) that can be expressed by equation (3):

$$NF = 10\log\left(\frac{S_i/N_i}{S_o/N_o}\right) \quad (3)$$

where So denotes the signal power of the output terminal of the power amplifier 140; So denotes the signal power of the input terminal of the power amplifier 140; No denotes the noise power of the output terminal of the power amplifier 140; and Ni denotes the noise power of the input terminal of the power amplifier 140.

After the reception power Pr of the receiver and the noise floor $N_{FL}$, the controller 120 can calculate the signal-to-noise ratio SNR that can be expressed by equation (4):

$$SNR = \frac{P_r}{N_{FL}} \quad (4)$$

where the signal-to-noise ratio SNR is expressed in units of dB. In the embodiment, if the IEEE 802.11n standard is taken as an example, the bandwidth of each Wi-Fi channel is 40 MHz, and the ideal transmission speed is 600 Mbps. In addition, each Wi-Fi channel has a corresponding number of users $U_{ideal}$. For example, there may be an estimate of 10 users.

Accordingly, the controller 120 can calculate a user ratio U corresponding to each Wi-Fi channel, where $U=U_{now}/U_{ideal}$, and $U_{now}$ denotes the current number of users of the channel.

The controller 120 may calculate the congestion traffic value CT of each Wi-Fi channel according to the calculated user ratio and the signal-to-noise ratio SNR of each Wi-Fi channel, and the congestion traffic value CT can be expressed by equation (5):

$$CT = \frac{U}{SNR} \quad (5)$$

After calculating the congestion traffic value CT of each Wi-Fi channel (e.g., $CT_1$ to $CT_{11}$), the controller 120 or the channel selector 130 may automatically select the Wi-Fi channel having the smallest congestion traffic value CT to communicate with the WTRUs 20-a to 20-n.

In addition, after selecting the Wi-Fi channel having the smallest congestion traffic value CT for communication, the measurement device 135 may repeatedly measure the operation parameters and noise parameters in the aforementioned embodiment, and the controller 120 may repeatedly update the signal-to-noise ratio SNR of the currently selected channel according to the updated operation parameters and noise parameters. In addition, the controller 120 may divide the values of signal-to-noise ratio SNR of the currently selected channel into a plurality of levels. For example, given that the ideal maximum value of the signal-to-noise ratio SNR is $SNR_{best}$ and the ideal worst value of the signal-to-noise ratio SNR is $SNR_{worst}$, the margin between the ideal maximum signal-to-noise ratio $SNR_{best}$ and the ideal worst signal-to-noise ratio $SNR_{worst}$ can be evenly divided into a plurality of levels, namely, a first level, a second level, and a third level based on the SNR value from low to high. That is, the range of the first level is between $SNR_{worst}$ and $(SNR_{best}+SNR_{worst})/3$, and the range of the first level is between $(SNR_{best}+SNR_{worst})/3$ and $2*(SNR_{best}+SNR_{worst})/3$ and the range of the third level is between $2*(SNR_{best}+SNR_{worst})/3$ and $SNR_{best}$.

In the embodiment, the communication device 100 may include a plurality of light indicators (e.g., light-emitting diodes) to represent the level of the signal-to-noise ratio SNR of the currently selected channel. For example, when the signal-to-noise ratio SNR of the currently selected channel is respectively at the third level, second level, and first level, the light indicator may emit green light, yellow light, and red light. If any of the WRTUs 20-a to 20-n has connected to the communication device 100, when the controller 120 determines that the signal-to-noise ratio SNR of the currently selected Wi-Fi channel (e.g., channel 5) has been kept at the first level for a predetermined time, the controller 120 will send a notification signal indicating the currently calculated best Wi-Fi channel (e.g., channel 6) to the connected WTRUs 20-a to 20-n to ask the user whether to switch the currently selected Wi-Fi channel to the calculated best Wi-Fi channel. If the user agree to switch the currently selected Wi-Fi channel to the calculated best Wi-Fi channel, the communication device 100 will disconnect the connections of the currently selected Wi-Fi channel, and re-communicate with the WTRUs 20-a to 20-n using the calculated best Wi-Fi channel. If the user does not agree to switch the currently selected Wi-Fi channel to the calculated best Wi-Fi channel, the controller 120 may calculate the best Wi-Fi channel again after a predetermined time (e.g., 30 minutes or an hour, but it is not limited thereto), and sends the notification signal to the connected WTRUs 20-a to 20-n to ask the user whether to switch the currently selected Wi-Fi channel to the calculated best Wi-Fi channel.

Figure 3:
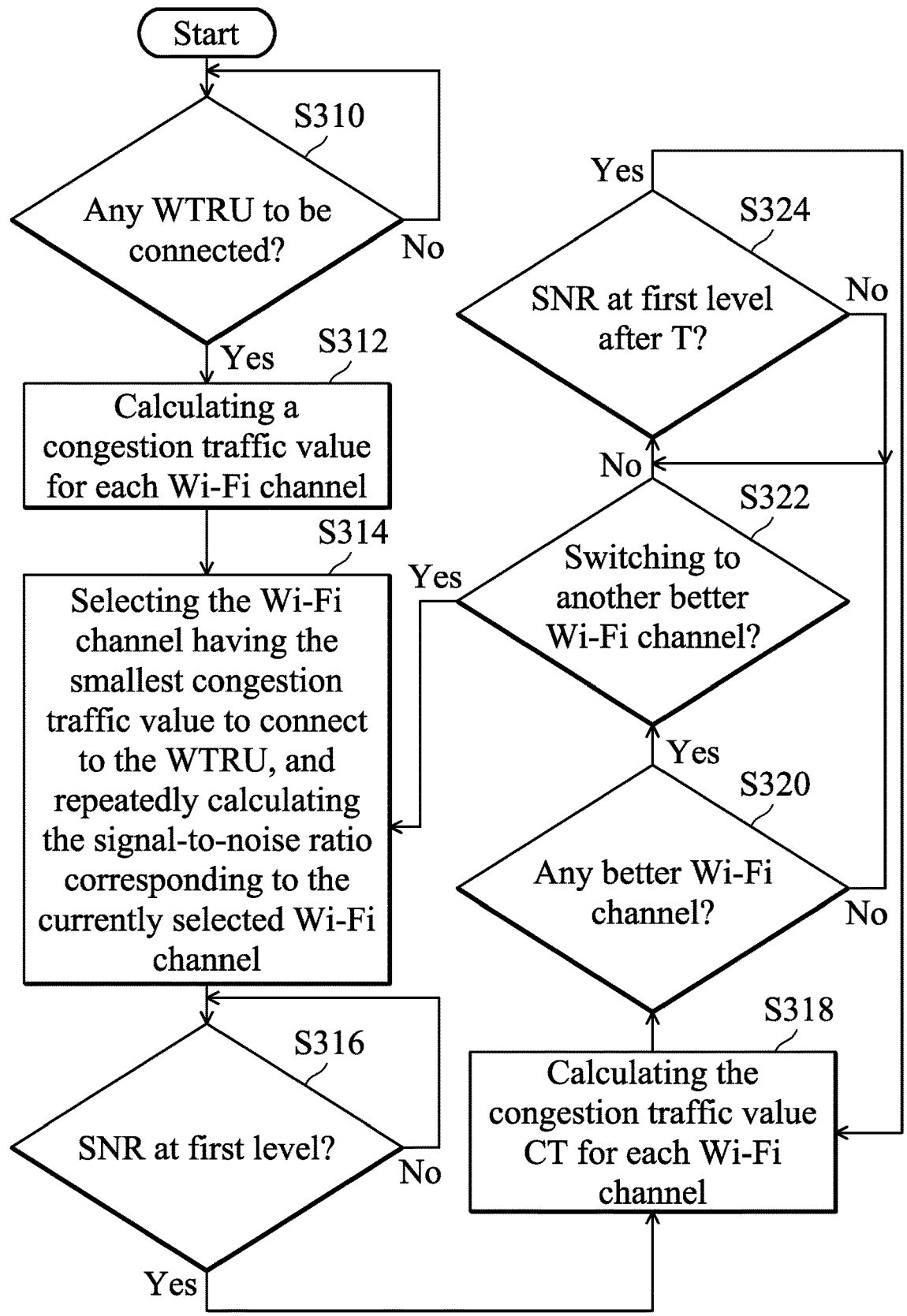
FIG. 3 is a flow chart of a Wi-Fi channel auto-selection method in accordance with an embodiment of the disclosure.

FIG. 3 is a flow chart of a Wi-Fi channel auto-selection method in accordance with an embodiment of the disclosure.

Referring to FIG. 1 and FIG. 3, in step S310, the communication device 100 determines whether any WTRU is to be connected. If there is a WTRU is to be connected, step S312 is performed. If there is no WTRU is to be connected, the flow returns to step S310 for monitoring.

In step S312, the communication device 100 calculates a congestion traffic value for each Wi-Fi channel. For example, the controller 120 may obtain various operation parameters and noise parameters from the measurement device 135, and calculate the signal-to-noise ratio SNR of each Wi-Fi channel according to the obtained operation parameters and noise parameters. In addition, the controller 120 may calculate a user ratio U corresponding to each Wi-Fi channel, and then calculate the congestion traffic value CT corresponding to each Wi-Fi channel according to the signal-to-noise ratio SNR and user ratio U of each Wi-Fi channel, where the details of calculating the signal-to-noise ratio SNR, user ratio U, and congestion traffic value CT of each Wi-Fi channel can be found in the aforementioned embodiment.

In step S314, the communication device 100 selects the Wi-Fi channel (i.e., the best Wi-Fi channel) having the smallest congestion traffic value CT to connect to the WTRU, and repeatedly calculates the signal-to-noise ratio SNR corresponding to the currently selected Wi-Fi channel. For example, the signal-to-noise ratio SNR of the currently selected Wi-Fi channel may be located at the first level, second level, or third level based on the ideal maximum signal-to-noise ratio $SNR_{best}$ and the ideal worst signal-to-noise ratio $SNR_{worst}$, where the first level may denote that the signal quality of the currently selected Wi-Fi channel is poor, and can be expressed using the red light indicator; the second level may denote that the signal quality of the currently selected Wi-Fi channel is fair, and can be expressed using the yellow light indicator; the third level may denote that the signal quality of the currently selected Wi-Fi channel is excellent, and can be expressed using the green light indicator.

In step S316, the communication device 100 determines whether the signal-to-noise ratio SNR of the currently selected Wi-Fi channel is at the first level. If the signal-to-noise ratio SNR of the currently selected Wi-Fi channel is at the first level, step S318 is performed. If the signal-to-noise ratio SNR of the currently selected Wi-Fi channel is not at the first level, step S316 is performed to repeatedly determine whether the signal-to-noise ratio SNR of the currently selected Wi-Fi channel is at the first level.

In step S318, the communication device calculates the congestion traffic value CT for each Wi-Fi channel. For example, If the signal-to-noise ratio SNR of the currently selected Wi-Fi channel is at the first level, it indicates that the signal quality of the currently selected Wi-Fi channel becomes poor, and thus it should be considered whether to switch the Wi-Fi channel, thus recalculating the congestion traffic value CT corresponding to each Wi-Fi channel.

In step S320, the communication device 100 determines whether there is another Wi-Fi channel better than the currently selected Wi-Fi channel according to the congestion traffic value corresponding to each Wi-Fi channel. If there is another Wi-Fi channel better than the currently selected Wi-Fi channel, step S322 is performed. If there is no Wi-Fi channel better than the currently selected Wi-Fi channel, step S324 is performed.

In step S322, the communication device notifies the user (e.g., by sending a notification signal) of whether to switch to another Wi-Fi channel better than the currently selected Wi-Fi channel. If the user confirms to switch to another Wi-Fi channel better than the currently selected Wi-Fi channel, step S314 is performed to select the best Wi-Fi channel. If the user confirms not to switch to another Wi-Fi channel better than the currently selected Wi-Fi channel, step S324 is performed.

In step S324, after a predetermined time T (e.g., 1 hour), the communication device 100 determines whether the signal-to-noise ratio SNR of the currently selected Wi-Fi channel is at the first level. If the signal-to-noise ratio SNR of the currently selected Wi-Fi channel is at the first level, step S318 is performed to recalculate the congestion traffic value corresponding to each Wi-Fi channel. If the signal-to-noise ratio SNR of the currently selected Wi-Fi channel is not at the first level, step S324 is performed again.

In view of the above, a Wi-Fi channel auto-selection method and a communication device using the same are provided in the disclosure. The method and the communication device are capable of selecting the best Wi-Fi channel according to the congestion traffic value corresponding to each Wi-Fi channel, wherein the congestion traffic value can be calculated according to the signal-to-noise ratio and user ratio corresponding to each Wi-Fi channel. In addition, after the Wi-Fi channel has been selected, the method and communication device may still repeatedly determine whether to notify the user to switch to the best Wi-Fi channel according to the signal-to-noise ratio of the currently selected Wi-Fi channel. Accordingly, the Wi-Fi channel auto-selection method and the communication device in the disclosure can enable a user to have a better user experience when using the WTRU to connect to the communication device.

While the disclosure has been described by way of example and in terms of the preferred embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A communication device, comprising:
 a measurement device, configured to measure a plurality of operation parameters and a plurality of noise parameters corresponding to a plurality of wireless fidelity (Wi-Fi) channels used by the communication device; and a controller;

wherein in response to the controller determining that a wireless transmitter/receiver unit (WTRU) is to connect to the communication device, the controller calculates a signal-to-noise ratio and a user ratio corresponding to each Wi-Fi channel according to the operation parameters and noise parameters, and divides a current number of users of each Wi-Fi channel by a predetermined number of users to obtain the user ratio corresponding to each Wi-Fi channel, wherein the controller calculates a congestion traffic value corresponding to each Wi-Fi channel by dividing the user ratio by the signal-to-noise ratio corresponding to each Wi-Fi channel, wherein the controller selects a first Wi-Fi channel having the smallest congestion traffic value from among the plurality of Wi-Fi channels to communicate with the WTRU.

2. The communication device as claimed in claim 1, wherein the controller calculates a reception power of a receiver of the communication device in each Wi-Fi channel according to a transmission power of a transmitter of the communication device, a first antenna gain of the transmitter, a second antenna gain of the receiver, and a distance between the communication device and an antenna of the WTRU.

3. The communication device as claimed in claim 2, wherein the controller calculates a noise floor value corresponding to each Wi-Fi channel according to a first signal power of an output terminal of a power amplifier of the communication device, a second signal power of an input terminal of the power amplifier, a first noise power of the output terminal of the power amplifier, a second noise power of the input terminal of the power amplifier, and a bandwidth of each Wi-Fi channel.

4. The communication device as claimed in claim 3, wherein:

the controller divides the reception power by the noise floor value corresponding to each Wi-Fi channel to obtain the signal-to-noise ratio corresponding to each Wi-Fi channel.

5. The communication device as claimed in claim 1, wherein the controller repeatedly calculates the signal-to-noise ratio of the selected first Wi-Fi channel, and the signal-to-noise ratio comprises a first level, a second level, and a third level.

6. The communication device as claimed in claim 5, wherein the controller classifies the signal-to-noise ratio into the first level, the second level, or the third level according to a predetermined maximum signal-to-noise ratio and a predetermined worst signal-to-noise ratio of the first Wi-Fi channel, wherein the third level is higher than the second level, and the second level is higher than the first level.

7. The communication device as claimed in claim 6, wherein in response to the signal-to-noise ratio corresponding to the first Wi-Fi channel being at the first level, the controller recalculates the congestion traffic value corresponding to each Wi-Fi channel.

8. The communication device as claimed in claim 7, wherein in response to the congestion traffic value corresponding to at least one of the Wi-Fi channels being smaller than the congestion value corresponding to the selected first Wi-Fi channel, the controller transmits a notification signal to the WTRU to notify the user to confirm whether to switch to a second Wi-Fi channel having a smaller congestion traffic value, wherein the second Wi-Fi channel is different from the first Wi-Fi channel.

9. The communication device as claimed in claim 8, wherein in response to the user confirming to switch to the second Wi-Fi channel having the smaller congestion traffic value, the controller calculates and selects the second Wi-Fi channel having the smallest congestion traffic value to reconnect to the WTRU.

10. The communication device as claimed in claim 9, wherein in response to the user confirming not to switch to the second Wi-Fi channel having the smaller congestion traffic value, the controller determines whether the signal-to-noise ratio corresponding to the selected first Wi-Fi channel is at the first level after a predetermined time; and in response to the signal-to-noise ratio corresponding to the selected first Wi-Fi channel being at the first level, the controller recalculates the congestion traffic value corresponding to each Wi-Fi channel.

11. A wireless fidelity (Wi-Fi) channel auto-selection method, for use in a communication device, wherein the communication device comprises a measurement device configured to measure a plurality of operating parameters and noise parameters corresponding to a plurality of Wi-Fi channels used by the communication device, the method comprising:

in response to determining that a wireless transmitter/receiver unit (WTRU) is to connect to the communication device, calculating a signal-to-noise ratio and a user ratio corresponding to each Wi-Fi channel according to the operation parameters and noise parameters, dividing a current number of users of each Wi-Fi channel by a predetermined number of users to obtain the user ratio corresponding to each Wi-Fi channel, and calculating a congestion traffic value corresponding to each Wi-Fi channel by dividing the user ratio by the signal-to-noise ratio corresponding to each Wi-Fi channel; and selecting a first Wi-Fi channel having the smallest congestion traffic value from among the plurality of Wi-Fi channels to communicate with the WTRU.

12. The method as claimed in claim 11, wherein the step of calculating the congestion traffic value corresponding to each Wi-Fi channel according to the signal-to-noise ratio and the user ratio corresponding to each Wi-Fi channel comprises:

calculating a reception power of a receiver of the communication device in each Wi-Fi channel according to a transmission power of a transmitter of the communication device, a first antenna gain of the transmitter, a second antenna gain of the receiver, and a distance between the communication device and an antenna of the WTRU.

13. The method as claimed in claim 12, wherein the step of calculating the congestion traffic value corresponding to each Wi-Fi channel according to the signal-to-noise ratio and the user ratio corresponding to each Wi-Fi channel further comprises:

calculating a noise floor value corresponding to each Wi-Fi channel according to a first signal power of an output terminal of a power amplifier of the communication device, a second signal power of an input terminal of the power amplifier, a first noise power of the output terminal of the power amplifier, a second noise power of the input terminal of the power amplifier, and a bandwidth of each Wi-Fi channel.

14. The method as claimed in claim 13, wherein the step of calculating the congestion traffic value corresponding to each Wi-Fi channel according to the signal-to-noise ratio and the user ratio corresponding to each Wi-Fi channel further comprises:
   dividing the reception power by the noise floor value corresponding to each Wi-Fi channel to obtain the signal-to-noise ratio corresponding to each Wi-Fi channel.

15. The method as claimed in claim 11, further comprising:
   repeatedly calculating the signal-to-noise ratio of the selected first Wi-Fi channel, wherein the signal-to-noise ratio comprises a first level, a second level, and a third level.

16. The method as claimed in claim 15, further comprising:
   classifying the signal-to-noise ratio into the first level, the second level, or the third level according to a predetermined maximum signal-to-noise ratio and a predetermined worst signal-to-noise ratio of the first Wi-Fi channel, wherein the third level is higher than the second level, and the second level is higher than the first level.

17. The method as claimed in claim 16, further comprising:
   in response to the signal-to-noise ratio corresponding to the first Wi-Fi channel being at the first level, recalculating the congestion traffic value corresponding to each Wi-Fi channel.

18. The method as claimed in claim 17, further comprising:
   in response to the congestion traffic value corresponding to at least one of the Wi-Fi channels being smaller than the congestion value corresponding to the selected first Wi-Fi channel, transmitting a notification signal to the WTRU to notify the user whether to switch to a second Wi-Fi channel having a smaller congestion traffic value, wherein the second Wi-Fi channel is different from the first Wi-Fi channel.

19. The method as claimed in claim 18, further comprising:
   in response to the user confirming to switch to the second Wi-Fi channel having the smaller congestion traffic value, calculating and selecting the second Wi-Fi channel having the smallest congestion traffic value to reconnect to the WTRU.

20. The method as claimed in claim 19, further comprising:
   in response to the user confirming not to switch to the second Wi-Fi channel having the smaller congestion traffic value, determining whether the signal-to-noise ratio corresponding to the selected first Wi-Fi channel is at the first level after a predetermined time; and
   in response to the signal-to-noise ratio corresponding to the selected first Wi-Fi channel being at the first level, recalculating the congestion traffic value corresponding to each Wi-Fi channel.

* * * * *